Figure 1:
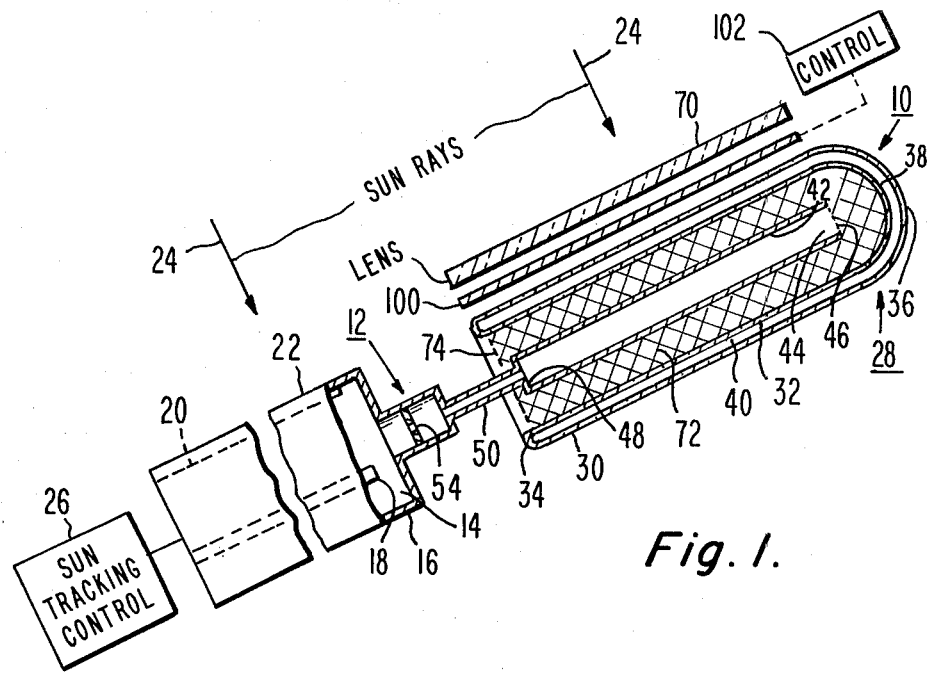

United States Patent [19]

Jebens

[11] 4,242,112
[45] Dec. 30, 1980

[54] SOLAR POWERED DEHUMIDIFIER APPARATUS

[75] Inventor: Robert W. Jebens, Skillman, N.J.

[73] Assignee: RCA Corporation, New York, N.Y.

[21] Appl. No.: 44,528

[22] Filed: Jun. 1, 1979

[51] Int. Cl.³ .............................................. B01D 53/28
[52] U.S. Cl. ..................................... 55/269; 55/161;
55/208; 55/387; 137/845; 137/859
[58] Field of Search ................. 55/161, 183, 208, 269,
55/387; 165/48 S; 137/845, 852, 859

[56] References Cited

U.S. PATENT DOCUMENTS

| 2,334,032 | 11/1943 | Rhodes | 137/859 X |
|---|---|---|---|
| 2,462,952 | 3/1949 | Dunkak | 55/208 |
| 2,941,544 | 6/1960 | Peras | 137/859 X |
| 3,472,000 | 10/1969 | Glass et al. | 55/387 X |
| 3,593,498 | 7/1971 | Semon | 55/387 X |
| 3,594,990 | 7/1971 | Hawley | 55/208 X |
| 3,827,218 | 8/1974 | Settlemyer | 55/387 X |
| 4,068,652 | 1/1978 | Worthington | 165/48 S X |
| 4,113,004 | 9/1978 | Rush et al. | 165/3 |

*Primary Examiner*—Richard L. Chiesa
*Attorney, Agent, or Firm*—Samuel Cohen; William Squire

[57] ABSTRACT

A thermally insulated light transmitting housing forms a chamber containing a desiccant and having a first gas port open to the ambient and a second gas port connected by a two way valve to a volume to be dried. Solar energy transmitted through the housing heats and dries the desiccant. The increased air pressure due to the heating of the volume to be dried causes the air from the volume to be expelled through the valve into the chamber. The desiccant is then cooled by shielding it from solar energy before the volume cools thereby increasing its moisture absorbing capacity. Then the volume is allowed to cool drawing dehumidified air through the desiccant and the valve into the volume to be dried. This cycle is then repeated.

5 Claims, 4 Drawing Figures

U.S. Patent  Dec. 30, 1980  4,242,112

SOLAR POWERED DEHUMIDIFIER APPARATUS

The United States Government has rights in this invention pursuant to a contract awarded by the Department of Energy.

Currently, there is much research in the field of energy conversion utilizing solar energy as the source of power. It includes work in the conversion of solar energy to electrical power and to heat. This research is important because it can reduce our dependence on fossil fuels such as oil. The present invention is directed to utilizing solar radiation for dehumidification.

There are two types of dehumidifiers which are popular at present. In one, the temperature of the air is reduced, lowering its dew point and therefore lowering its moisture content. This type is used in air conditioners which, as is well known, consume relatively large amounts of electrical power.

A second type of dehumidifier is one employing desiccants such as silica gel or other materials. These have the property of absorbing moisture from the air or other gas when the air (or gas) is passed over the desiccant. Heating the desiccant drives the moisture from it. For example, when a silica gel desiccant is raised to a temperature of approximately 350° F., most moisture is driven from it. When the temperature is reduced to the ambient temperature, the gel once again has high moisture absorbing characteristics. Such materials therefore, to be satisfactory for continuous use, periodically need to be purged of moisture by heat. For example, in U.S. Pat. No. 3,594,990 a portable dehumidifier is disclosed in which the desiccant is purged by employing a heating device comprising an electrical heating element. However, the use of electrical energy for the purposes of heating can be inefficient and costly.

A solar energy operated dehumidifier apparatus in accordance with the present invention includes a thermally insulated housing which forms a gas chamber between and in fluid communications with first and second gas ports. A desiccant is placed within the chamber. The housing has a light transmitting window for transmitting solar radiation onto the desiccant for heating the desiccant and purging the desiccant of moisture. Valve means are included for passing gas between one of the ports and a volume to be dried in either of two selected opposite directions. The other port is coupled to the ambient atmosphere.

Figure 2:
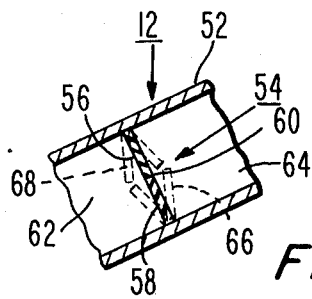
Figure 3:
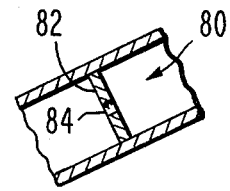
Figure 4:
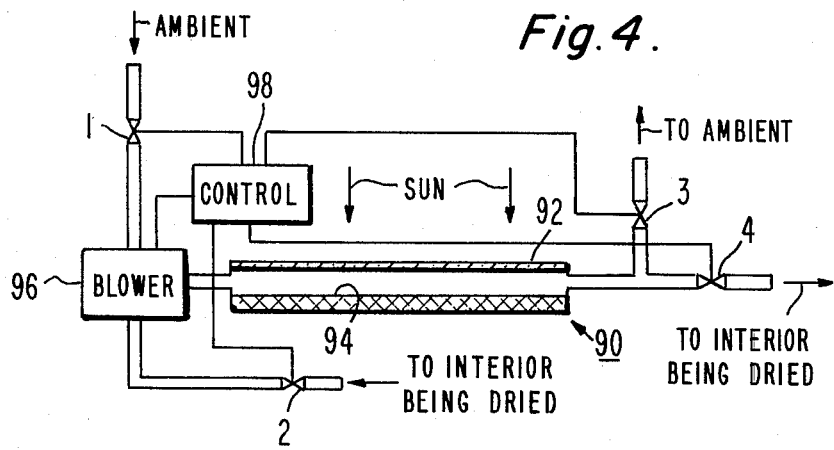

IN THE DRAWING:

FIG. 1 is a side elevation partially fragmented view of an apparatus embodying the present invention, FIG. 2 is a side elevation sectional view of a valve used in the embodiment of FIG. 1, FIG. 3 is a side elevation sectional view of an alternate valve construction for use in the embodiment of FIG. 1, and FIG. 4 is a diagrammatic illustration of an apparatus in accordance with a second embodiment of the present invention.

In FIG. 1, dehumidifying apparatus 10 is connected via a valve assembly 12 to interior volume 14 containing the gas to be dried. Housing 16 houses, by way of example, an array of solar cells 18 (dashed). Housing 16 could be any enclosure in which it is desired to dehumidify the enclosed gas. The solar cells 18 receive incident solar energy focused on the cells by lenses 20 (dashed). The housing 16 is a relatively gas tight chamber, but may exhibit some gas leakage. That is, chamber 16 is not hermetically sealed. Transparent wall 22 of housing 16 is oriented to face the rays 24 of the sun by a sun tracking control 26. The control 26, housing 16, solar cells 18, and lenses 20 are conventional and need not be described in further detail herein.

Housing 16 prevents contamination of lenses 20 and cells 18 by ambient foreign particles such as debris including leaves, atmospheric dirt and the like. Without a hermetic seal for the volume 14, ambient air may leak into the volume 14 and on occasion air within the volume 14 leaks to the ambient atmosphere. That is, there is a small amount of flow of air between the ambient atmosphere and volume 14. The reasons for this is that during the daylight hours the housing 16 and its interior volume 14 are raised to considerably higher temperatures than ambient air temperatures due to the concentration of the solar energy on the cells 18. This increases the pressure of the gas (air) in the volume 14 and some of the air "leaks" (is forced) out of the housing 16 and into the ambient space. During evening hours when the sun goes down, the volume 14 cools off, the interior pressure of volume 14 decreases below the ambient atmosphere and ambient air returns to the volume 14 within the housing 16. As air within the volume 14 cools, condensation occurs within the volume 14 on the lenses 20 and on the solar cells 18. This condensation may cause corrosion and may reduce the efficiency of the operation of the solar cells 18 and lenses 20.

For these reasons, it is desired that the volume 14 be dehumidified. However, to provide a passive dehumidifier, such as a desiccant material, requires periodic purging of that material as mentioned above in the introduction.

As provided in accordance with the present invention, dehumidifier apparatus 10 operates on solar energy and does not require any electrical or other power inputs and forms with the volume 14 a solar energy operated self sustaining desiccant purging system.

Dehumidifier apparatus 10 comprises an outer double walled vacuum Dewar flask 28, such as used in conventional thermos bottles. The flask 28 comprises two concentric cylindrical walls 30 and 32 hermetically sealed at end 34 and having continuous bottom walls 36 and 38. A vacuum is present in the space 40 between walls 30 and 32. A cylindrical tubular member 42 is located inside of the flask 28. The elongated axis of the member 42 is coaxial with the elongated axis of flask 28. Tubular member 42 has an open end 44 which is in close proximity to wall 38 of the flask 28. The purpose of screen 46 over the end 44 is to prevent particles from entering the enclosed volume of tubular member 42. The other end 48 of the tubular member 42 is connected to a tube 50 of smaller diameter than the member 42. Tube 50 is connected to the valve assembly 12. The assembly 12 is shown in more detail in FIG. 2.

Referring to FIG. 2, the valve assembly comprises:
a split flap valve 54 within an outer tubular member 52.
The valve 54 comprises two flexible rubber flaps 56 and 58 separated from each other by a slit 60. The valve could instead be a sheet of rubber with a slit in it.

In operation of the valve, when the pressure in the volume 62 (which is an extension of volume 14) is greater than the pressure in the volume 64 (which leads to the interior of member 42) the valve flaps are forced open to the dashed position at 66 causing air in the volume 62 to flow into the volume 64. In the converse case, that is, when the pressure in volume 64 is greater than the pressure in the volume 62, the valves assume the open dashed position 68. When there is negligible pressure differential between the volumes 62 and 64, the valve assumes the position shown solid and is closed. Valve 54 is made of sufficiently flexible material that very small pressure differentials can operate the valve. For example, the valve preferable for this embodiment should operate when a minimum pressure differential of 0.1 inches of water is present across the valve.

Cylindrical Fresnel lens 70 is disposed between the Dewar flask 28 and the sun. The lens 70 concentrates the solar rays 24 onto a line on the Dewar flask 28, and more particularly on the desiccant 72.

Desiccant 72, such as silica gel or any other suitable material, fills the cavity between the tubular member 42 and the inner walls 32 and 28 of flask 28. Screen 74 over the open end of the flask 28 and screen 46 retain the desiccant 72 within the chamber between member 42 and the flask walls 32 and 38. The tubular member 42 and the desiccant 72 may be darkened with graphite to provide relatively high absorptivity of solar energy from rays 24.

Mounted between lens 70 and flask 28 is shutter 100 operated by control 102. Control 102 closes the shutter to prevent rays 24 from reaching flask 28 during the end of the afternoon in a period of two to four hours prior to sunset. Control 102 may be mechanical linkages connected to the tracking mechanism operating housing 16 so that at the appropriate time, the linkages (not shown) are operated by the relative displacement between the moving housing 16 and the fixed framework (not shown). Depending upon the amount of relative displacement, the shutter 100 is then relatively quickly opened or closed as the case may be.

In operation, the sun tracking control 26 rotates the solar array housing 16 so that transparent wall 22 faces the sun during daylight hours. Approximately two to four hours prior to sundown the dehumidifier apparatus 10 is shadowed by shutter 100 operated by control 102 to prevent the sun rays 24 from reaching the lens 70 and the desiccant 72. During evening hours, of course, no solar energy reaches the dehumidifier apparatus 10 or the housing 16. Flask 28 has its open end pointing downward to protect the interior from rain.

Assuming a sunny day, the sun's rays heat the volume 14 in housing 16 and by known principles, the desiccant 72. The concentrated rays formed by the lens 70 raise the temperature of the desiccant 72 to a much higher value than otherwise possible. As the volume 14 heats up, the pressure of the gas within the volume increases. High temperatures inside the flask 28 caused by the concentrated solar energy also causes an increased pressure therein. This increased pressure is a combination of elevated temperature of the air and the vapor pressure produced by the evaporating moisture from the desiccant 72. This increased pressure being greater than the ambient pressure causes the moisture laden air to flow freely through the screen 74 into the ambient air, the elevated pressure in volume 14 preventing the moisture laden air from the desiccant from passing into the housing 16.

During morning hours, the increasing volume 14 pressure opens the valve 54 causing a positive pressure on the interior of tubular member 42. This higher pressure causes a flow of gas through the desiccant 72 into the ambient. This action purges the moisture from the desiccant 72. The relatively small pressure, for example, as low as 0.10 inches of water, existing between the pressures in the volume 14 and the desiccant 72 is sufficient to open the valve 54 to cause the flow of gas. During the remainder of the day the valve 54 closes. The reason for this is that the air in the volume 14 reaches an elevated equilibrium temperature with the desiccant volume and the pressure differential across the valve 54 becomes less than the threshold pressure differential for operating the valve 54. During this portion of the cycle the desiccant is heated to over 300° F. and gives up moisture which escapes through screen 74 into the ambient, drying the desiccant and purging it of its moisture. This moisture laden air is prevented from entering volume 14 by valve 54.

Approximately two to four hours before sundown the dehumidifier apparatus 10 is placed in the shade by the action of shutter 100 under control of the control 102. This action cools off the dessicant reducing its temperature and increasing its moisture absorbing capacity. It takes several hours for this to occur. Meanwhile, the housing 16 is still exposed to the sun's rays 24, is at an elevated temperature, and may still have sufficient positive pressure therein to cause a flow of the interior volume 14 air to flow through the tubular member 42 into the ambient atmosphere through the desiccant 72, the valve being at position 66, FIG. 2. It is assumed that the volume 14 air is relatively dry and the desiccant absorbs relatively little moisture. If not, then the desiccant 72 will absorb some of the moisture and the desiccant 72 won't be completely dried out until several daily cycles occur until the volume 14 is relatively dry.

When the Dewar flask 28 enters the shade prior to sundown, the desiccant 72 cools off while the valve 54 is still closed and the air in the housing 16 is still warm. At sunset, the air in the volume 14 rapidly cools and contracts. This results in a less than ambient pressure in the volume 14 and the valve 54 opens. Air is drawn through the dry cool desiccant 72 from the ambient space through valve 54 into the volume 14 by this pressure differential. The desiccant absorbs the moisture from this air, drying it out. When the pressure in the volume 14 equalizes with that of ambient pressure, the valve 54 closes.

The next morning when the sun rises, air in the volume 14 heats up and expands, opening the valve 54. The excess air resulting from the pressure differential between the volume and ambient atmosphere passes through the desiccant 72 which is also heating up. The cycle as described above then repeats and the desiccant is reconditioned fully during the following sunny day.

Assuming a number of continuous days in which clouds are sufficient to prevent the sun from reaching the apparatus, some moisture may be picked up by the volume 14 due to the desiccant 72 losing its moisture absorbing quality. However, the volume of desiccant 72 is made such that it is sufficiently great to allow for such action. That is, the volume of desiccant 72 is sufficient to absorb moisture from the volume 14 for a number of continuous sunless days without the desiccant becoming fully saturated.

This system operates less efficiently on partly cloudy days when the desiccant 72 is not completely purged. During the evening hours, cool moist air may then be drawn in over the unpurged desiccant 72. However, the volume of desiccant 72 is made sufficiently great that during normal operation there is excess moisture absorbing capacity in the desiccant 72 sufficient to absorb the moisture from the air passing over the desiccant on such partly cloudy days.

In FIG. 3 is shown an alternate valve arrangement. Here the valve 80 comprises an apertured plate 82 having an aperture 84 of sufficiently small cross section as to restrict flow of the moisture laden air forcing it to escape to the ambient through the open end of the Dewar flask 28. The aperture 84 is sufficiently large with respect to the leakage openings in the housing 16 such that when the volume 14 heats up during the day the resulting temperature differential between the interior volume 14 and the ambient temperature causes a flow of air through the aperture 84 which is much larger than any flow due to leakage.

Other valving arrangement such as two way check valves may alternatively be used. In a two way check valve a first check valve permits air to flow from the volume 14 to the tubular member 42 and a second check valve permits air to flow from the volume of member 42 to the volume 14.

A system operated in accordance with the present invention can provide a ten to thirty percent relative humidity. A volume of 150 cubic centimeters per hour is transferred between volume 14 and the ambient atmosphere with a 0.1 inches of water pressure differential between the volume 14 to be dried and the ambient air. For this flow rate and for a volume 14 of about 15 cubic feet 170 grams of silica gel are employed.

In FIG. 4 is shown a second embodiment of the present invention. Here a flat plate collector 90 includes a thermal insulating light transparent window 92 and a layer of desiccant 94. The layer of desiccant 94 may be made black to provide high solar absorptivity. Lenses (not shown) may be used to focus the sun's rays on the desiccant 94 if desired in accordance with a particular implementation. Other means to obtain higher temperatures such as multiple glazing of the window or mirrors to concentrate the light may also be used. Valve 1 connects the ambient to a blower 96 which is connected to one end of collector 90. Valve 2 connects the interior volume to be dried to blower 96. Blower 96 may either (1) force ambient air through valve 1 through the collector 90 or (2) air from the volume being dried through valve 2 through the collector 90 depending upon the states of valves 1 and 2. Valve 3 connects the ambient to the opposite end of collector 90 and a valve 4 connects the interior volume being dried to this other opposite end of collector 90.

A control 98 operates valves 1, 2, 3 and 4 and blower 96. Control 98 determines which of the valves 1-4 are open and closed and the timing of their open and closed states.

In operation, during daylight hours solar energy is incident on the desiccant 94 and heats it up. During this time the control 98 closes valves 2 and 4 and opens valves 1 and 3. Blower 96 is then operated. While the desiccant 94 is heated, ambient air is forced through the collector 90 to the ambient. The ambient air forced through the collector picks up the moisture given off by the heated desiccant and returns the moisture to the ambient. At sunset, the blower 96 is shut off and the valves 1 and 3 closed. The desiccant 94 cools during evening hours. During the early morning hours before the sun rises, control 98 opens valve 2 and 4 and turns on blower 96. This blows air from the volume to be dried through the collector 90 over the desiccant 94 drying the air.

What is claimed is:

1. A solar energy operated dehumidifier apparatus comprising:

a housing containing a volume of air to be dried, a thermally insulated conduit means in fluid communication with said volume of air and the ambient atmosphere, said conduit means including light transmitting wall means for transmitting incident solar energy within a conduit formed by said conduit means, a solar energy absorbing desiccant in said conduit receptive to said transmitted solar energy for converting said solar energy to heat and thereby drying said desiccant, said desiccant being positioned so that air passing between said volume and the ambient engages said desiccant, and valve means including means for connecting said valve means between said conduit means and a volume to be dried, said valve means being normally closed and responsive to pressure differentials which may exist between said volume to be dried and the ambient atmosphere for passing air from said volume when heated by said solar energy and at a pressure greater than ambient pressure through said desiccant to the ambient atmosphere and from the ambient atmosphere back to the volume when the volume is cooled and at a pressure lower than ambient pressure in the absence of said incident solar energy.

2. The apparatus of claim 1 further including focus means for focusing solar energy on said desiccant.

3. The apparatus of claim 1 wherein said conduit means comprises a light transmitting double walled cylindrical container closed at one end and having a vacuum between the walls thereof forming a combined single outer thermal insulating wall and an interior conduit extending within said container and open at an end thereof within said container and adjacent said closed end, said desiccant being between said interior conduit and said outer double wall.

4. The apparatus of claim 1 further including means for shielding the conduit means from said solar energy prior to the cooling of said volume.

5. A solar radiation operated dehumidifier comprising in combination:

a first chamber containing air it is desired to dehumidify; the pressure in said first chamber increasing as said first chamber is heated;

a second chamber containing a desiccant, the two chambers including wall means transparent to solar radiation;

means venting the second chamber to the ambient air;

air conduit means joining the two chambers;

two way valve means within the air conduit means responsive to (1) increased pressure within the first chamber, when it becomes heated by the solar radiation, for passing air from the first chamber into the second chamber, the solar radiation also causing the moisture in the desiccant in the second chamber to be vented to the ambient air; and (2) decreased pressure within the first chamber, when it becomes cooled in the absence of solar radiation, for passing air from the second chamber to the first chamber, and shutter means adjacent said second chamber wall means including control means for masking the second chamber from the sun prior to sundown to cool said second chamber and thereby increase its moisture absorbing capacity, whereby so long as the pressure in the first chamber exceeds that in the second, air from the first chamber passes through the valve means into the second chamber, and when the first chamber cools to a point such that its pressure becomes lower than that of the ambient air, the latter passes through the second chamber where it becomes dehumidified by the desiccant and then through the valve means into the first chamber.

* * * * *